United States Patent [19]

Kis

[11] Patent Number: 4,643,037
[45] Date of Patent: Feb. 17, 1987

[54] GEAR CHANGE MECHANISM

[75] Inventor: Charles J. Kis, Mukwonago, Wis.

[73] Assignee: Kearney & Trecker Corporation, West Allis, Wis.

[21] Appl. No.: 647,554

[22] Filed: Sep. 5, 1984

[51] Int. Cl.⁴ .............................................. F16H 3/22
[52] U.S. Cl. ...................................... 74/342; 74/346; 74/421 R
[58] Field of Search ............... 74/321, 346, 421 R, 74/335, 342, 344, 345, 347, 350

[56] References Cited

U.S. PATENT DOCUMENTS

| | | | |
|---|---|---|---|
| 1,674,200 | 6/1928 | Gatten | 74/421 R |
| 3,225,620 | 12/1965 | Dubin | 74/342 |
| 3,631,945 | 1/1972 | Ollearo | 74/346 |
| 4,389,137 | 6/1983 | Riedhl | 404/113 |
| 4,449,866 | 5/1984 | Lohneis et al. | 74/342 |

Primary Examiner—Lawrence Staab
Assistant Examiner—Martin G. Belisario
Attorney, Agent, or Firm—James O. Skarsten

[57] ABSTRACT

A gear change mechanism for a machine tool in which shifting forks with sliding gears and constant mesh gearing using clutch and/or brake shifting is eliminated. A shiftable gear mechanism is presented in a gear train for meshing engagement with any one of a plurality of gears for selectively varying the speed of the machine spindle. The shiftable gear mechanism includes a first rotatable shaft and a second shaft connected to a cluster gear positioned to slide and rotate the second shaft in relation to the first shaft. A cylinder apparatus is connected coaxially to the second shaft to slide the second shaft in a reciprocating manner along the first shaft so as to move the cluster gear and vary the gear ratios between the cluster gear and the other gears in the gear train. A bearing assembly is also utilized in conjunction with the second slidable shaft so as to prevent any sliding action between the cluster gear and the shifting mechanism.

5 Claims, 6 Drawing Figures

GEAR CHANGE MECHANISM

BACKGROUND OF THE INVENTION

This invention relates to transmissions, and more particularly to an improved gear change mechanism for a transmission that produces a precision drive that is especially adapted for high speed machine tool applications.

Typical prior art gear change mechanisms consist generally of two types. In one type, a shifting fork and sliding gear arrangement is utilized and in another, constant mesh gearing using clutch and/or brake shifting is employed. As rotational speeds increase in the gear drive train these mechanisms cause one or more of the following undesirable traits. When using shifting forks, there is introduced a moment loading to the shifting gear, so that the shaft to gear fit must be comparatively loose, causing an out of balance condition as the gear is rotated. Further, shifting forks contact the shifting gear off the center of gear rotation, causing a sliding action between the gear and the shifter. Even with the addition of rollers to the shifting fork, the possibility of sliding, (power loss) occurring at high speed increases. Constant mesh gearing using clutchbrake shifting results in all gears always remaining in mesh. Such arrangement consumes additional power and adds inertia to the gear system. Also, clutch-brake units rated for high rotational speed are not readily available and may require additional control circuitry.

In U.S. Pat. No. 4,449,866 assigned to the assignee of this invention, there is described a servo-controlled spindle drive system utilizing a piston and cylinder mechanism for shifting a gear shaft 26 and its associated cluster gear 24. However, even though this particular gear change servo system does not utilize the previously referred to shifting fork and sliding gear arrangement or the constant mesh gearing utilizing clutch and/or brake shifting, it does have disadvantages in that it does not provide for precision fits and precise gear movements that especially adapt the transmission for high speed operation under relatively heavy loads while maintaining its accuracy for automatic operation under the control of a numerical control circuit.

It is an advantage of the present invention to provide an improved gear change mechanism which shifts the gears of a transmission with a force applied uniformly about the axis of the gear to prevent any misalignment during shifting so that the gear can be fitted onto its supporting shaft with extremely close tolerance and yet enable the gear to shift easily along the shaft without binding.

It is another advantage of the present invention to provide a shifting mechanism which reduces wasted power in the mechanism to an absolute minimum.

It is yet another advantage of the invention to provide an improved gear change mechanism that is especially adapted for high speed operation under relatively high load while transmitting the power with extreme accuracy for automatic operation under the control of a numerical control circuit.

It is still another advantage to provide a gear change mechanism which minimizes heat or other disturbances in a gear change system which includes a transmission and is operated at high speed.

BRIEF SUMMARY OF THE INVENTION

Briefly, in accordance with the illustrated embodiment of the invention, an improved gear change mechanism is provided for a machine tool having a spindle head thereon for rotatably driving the cutting tool-carrying spindle rotatably journaled in the spindle head at a plurality of speeds. The drive train includes a drive means such as an electric motor with an output shaft for rotation in unison with the machine tool spindle. A gear train is connected to transmit the drive from the output shaft of the motor to the spindle. A shiftable cluster gear in the gear train is in meshing engagement with any one of a plurality of gears for selectively varying the speed of the spindle. A gear shift means includes a rotatable and slidable shaft means comprising a first rotatable shaft and a second shaft positioned to slide and rotate in relation to the first shaft with the cluster gear connected for movement with the second shaft. A piston and cylinder mechanism actuates a slidable shaft coupled to the second shaft in a coaxial manner to slide the second shaft in a reciprocating manner and, accordingly the cluster gear therewith and over the first rotatable shaft. The means to connect the cluster gear to the second shaft includes a cross pin secured to the shiftable gear cluster. Slots are provided in the first shaft to permit the sliding of the second shaft with respect to the first shaft and the cross pin connection. Moreover, the slidable cylinder shaft is interconnected to said second shaft through a bearing assembly which will permit independent rotation of the second shaft. The slidable cylinder shaft is disposed coaxially with respect to the second shaft resulting in a coaxial relationship between the cluster gear, the first and second shafts and the shaft actuated by the piston and cylinder mechanism.

BRIEF DESCRIPTION OF THE DRAWINGS

The features of this invention believed to be novel are set forth with particularity in the appended claims, the invention itself, however, both as to organization and method of operation, together with further advantages thereof, may best be understood by reference to the following description taken in conjunction with the accompanying drawings in which:

DETAILED DESCRIPTION OF THE PREFERRED EMBODIMENT

Figure 1:
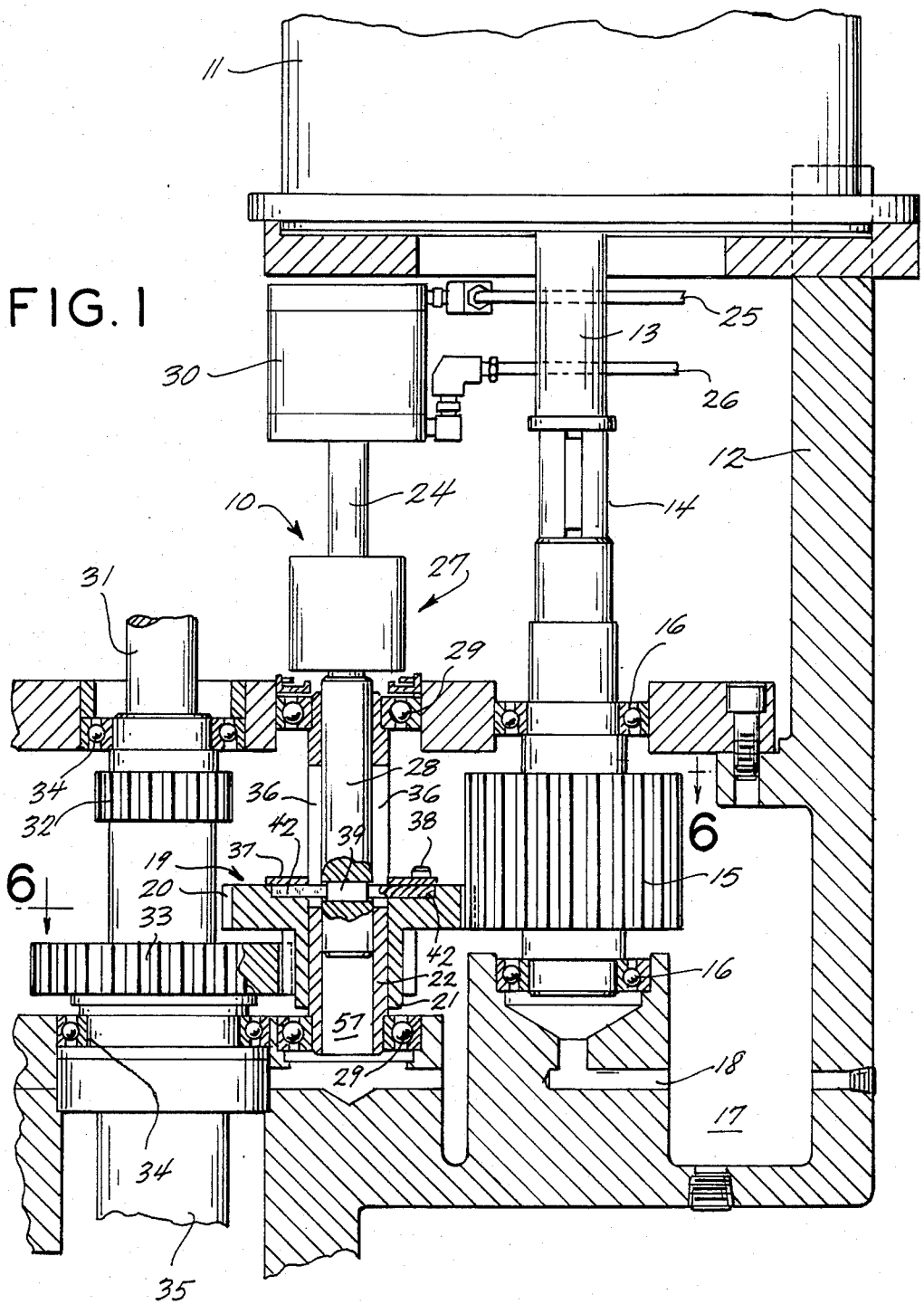
FIG. 1 is a view in side elevation with portions shown in section illustrating the gear change mechanism of this invention in conjunction with a spindle drive system.
Figure 2:
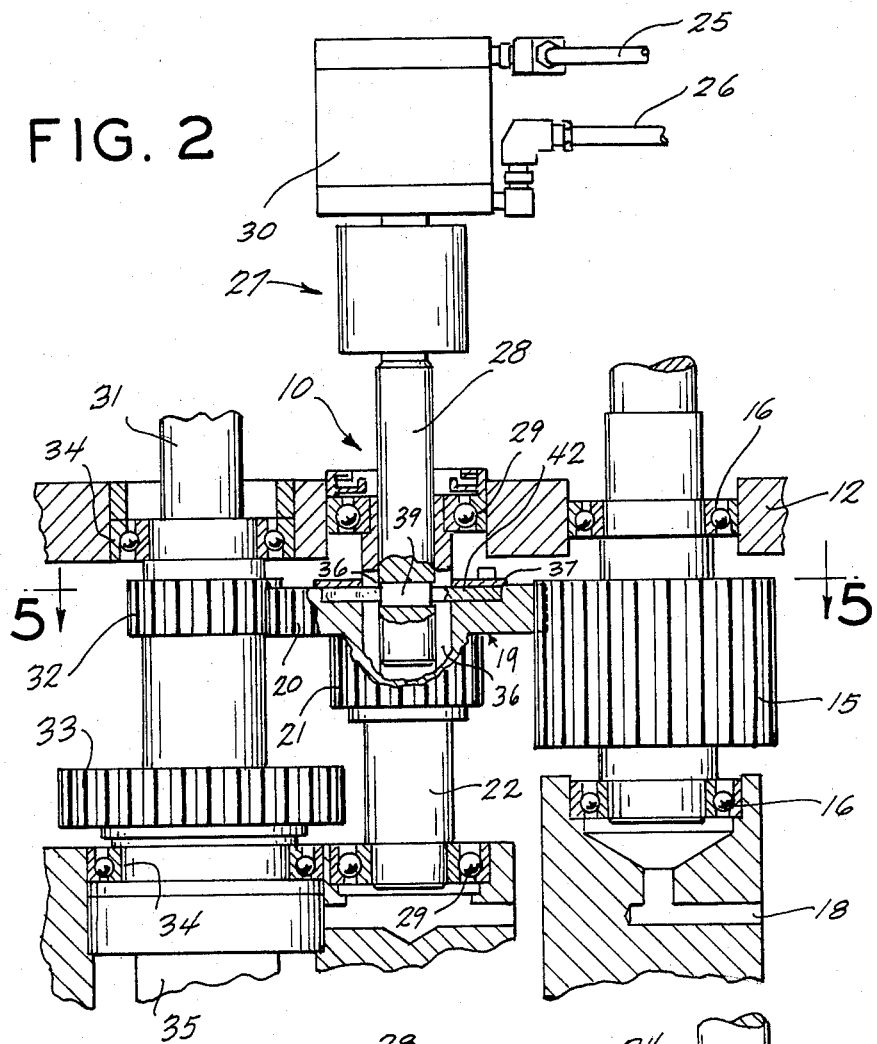
FIG. 2 is a view similar to FIG. 1 except showing the gear change mechanism shifted to a different position in the gear train for the spindle drive train.

Referring jointly to FIGS. 1 and 2, there is shown the gear change mechanism generally identified by the reference numeral 10, disposed within spindle head 12, which is mounted on a machine tool (not shown). The spindle head is arranged for reciprocal movement with respect to a work supporting table (not shown). A motor 11 is fastened to the spindle head 12 by a set of bolts or the like (not shown) so that the shaft 13 of the motor 11 extends into the spindle head 12 through a suitable passage therein. The shaft 13 is connected by a coupling 14 to a drive pinion 15 coaxial with the motor shaft and is supported by the bearings 16 for co-joint rotation with the motor shaft 13. It will be noted that the bearing 16 spaced the farthest from motor 11 is a thrust bearing and is provided with constant lubrication through oil reservoir 17 and oil line 18.

A cluster gear generally identified by the reference numeral 19 is fixed to a drawbar shaft 28 and is comprised of a main gear member 20 and an auxiliary gear member 21 located on one side of the main gear 20. The drawbar shaft 28 acts as an actuator and is slidable within a hollow central bore 57 of support shaft 22 that is rotatably journaled in spindle head 12 by bearings 29. The cluster gear 19 has a central bore 56 to slidably receive shaft 22 and is interconnected to the shaft 28 through a cross pin interconnection which will permit the sliding along slots 36 in the spindle shaft 22 as will be more particularly described in conjunction with FIG. 4. The draw bar shaft 28 is interconnected with a bearing assembly 27 which will be later described in detail in conjunction with FIG. 3. The bearing assembly generally 27 provides interconnection with the piston rod 24 of a reciprocating air cylinder 30 which will have the usual inlet lines 25 and 26 for pressurized air.

A driving shaft 31 is journaled in the spindle head 12 by bearings 34 for rotation about an axis parallel to the axis of rotation of both the drive pinion 15 and the cluster gear shafts 28 and 22. The driving shaft 31 has two gears 32 and 33 keyed thereon with each dimensioned to meshingly engage a separate one of the cluster gears 20 and 21. A machine tool spindle 35 extends from shaft 31 and is arranged as well known in the art for receiving various cutting tools for use in machining operations.

Figure 3:
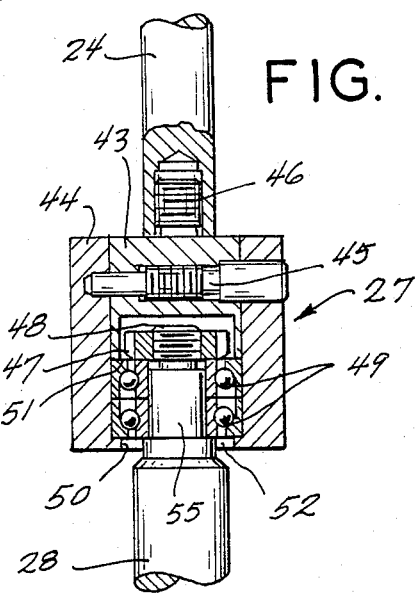
FIG. 3 is an enlarged view in vertical section showing the bearing mechanism for attaching the cylinder shaft to the shaft of the gear change mechanism.

Referring specifically to FIG. 3, it will be seen that the cylinder shaft 24 of the actuator is interconnected with the draw bar shaft 28 by the bearing assembly 27 which will include a screw thread 46 for securing an insert 43 to the shaft 24. A threaded pin 45 extends through the insert 43 and will secure it to a bearing carrier 44. A compartment 52 is provided in the bearing carrier 44 to accommodate two bearings 49 which will be retained therein by a flange portion 50 extending from the bearing carrier 44 at one side and by an annular portion 51 extending from the insert 43 and disposed at the other side. The bearings 49 will be retained on a reduced diameter section 55 of the shaft 28 by a lock nut 47 engaging threads 48 extending from the shaft.

Figure 4:
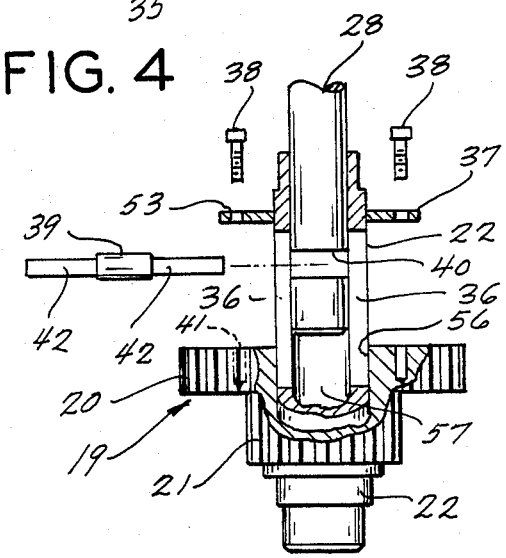
FIG. 4 is a detail view with portions shown in section illustrating the components for interconnecting the shaft of the shiftable gear mechanism with the cluster gear.
Figure 5:
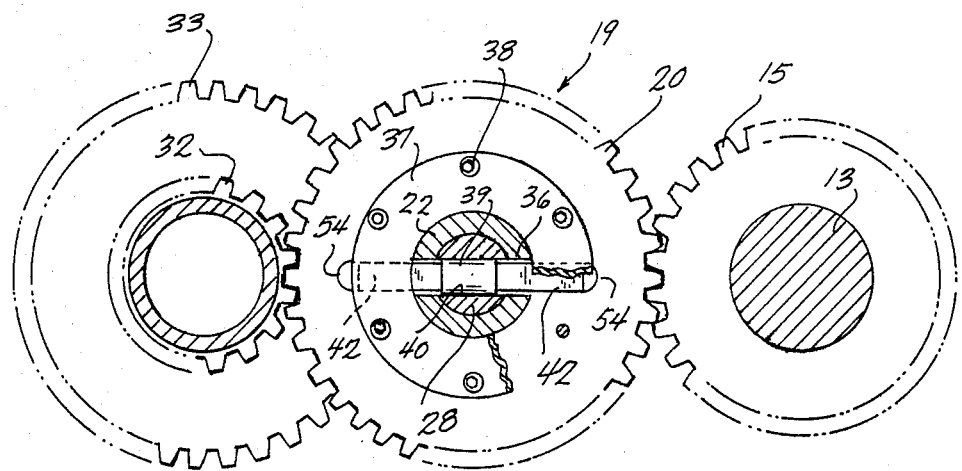
FIG. 5 is a view in horizontal section taken along line 5—5 of FIG. 2 and with portions broken away.
Figure 6:
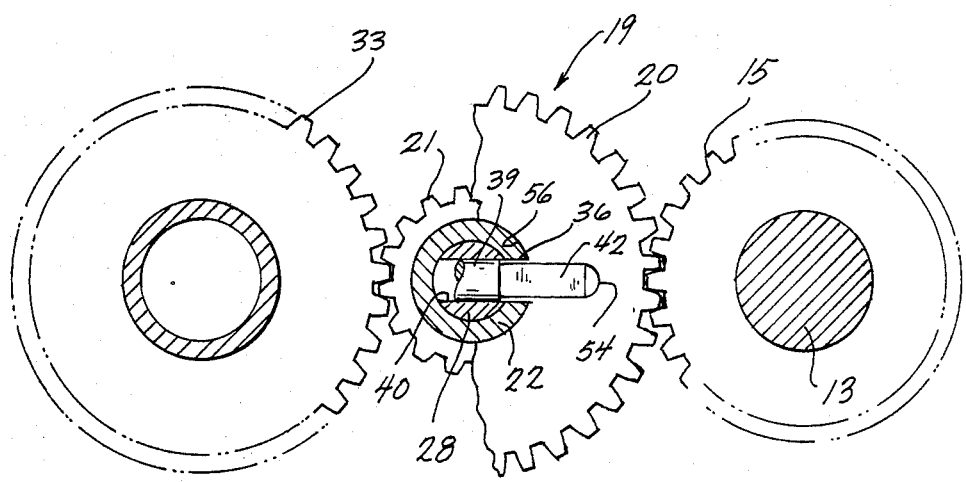
FIG. 6 is a view in horizontal section taken along line 6—6 of FIG. 1 and with portions broken away.

FIG. 4 specifically represents the attachment of the draw bar shaft 28 to the cluster gear 19. It should be pointed out that the cluster gear 19 is free to slide over the spindle shaft 22 and the latter has two slots 36 oppositely disposed therethrough, in parallel relation with the axis of support shaft 22. A keyway 40 is transversly positioned through the draw bar shaft 28 and will receive a key 39 which will be secured to the main gear 20 by the arm portions 42 which extend into a keyway 54 in the gear 20. This is best seen in conjunction with FIGS. 5 and 6 where it will be seen that the keyway 54 is coextensive with the keyway 40 in the draw bar shaft 28. An annular retainer 37 is received over the spindle shaft 22 and is secured to the face of the gear 20 by screws 38 to overlie the arm portions 42 of the key 39 as best illustrated in FIG. 5. The screws 38 pass through openings 53 in the retainer 37 and engage internal threads 41 in the main gear 20 to provide captive engagement of the key 39 in the keyways 40 and 54 of the shaft 28 and the main gear 20, respectively.

The connection of the cluster gear 19 to the drawbar 28 by means of the key 39 and arms 42 overlying the face of the gear insures that the force employed for shifting the gear is applied uniformly across the face of the gear. As a result, the gear remains in accurate balance during the shifting of the gear permitting the gear to be closely fitted to the spindle shaft 22 on which it slides without causing any binding during the shifting movement. Because of the close fit of the gear to its mating parts, the entire transmission may be operated at higher speeds without undue strains and overheating.

OPERATION

A better understanding of the advantages of the gear change mechanism 10 will be had by a description of its operation as follows.

It will be assumed that the drive shaft 13 is being driven by the motor 11 at a predetermined speed. As depicted in FIG. 2, the main gear 20 of the gear cluster 19 is engaging the drive pinion 15 as well as the gear 32 on the driving shaft 31. Should it be desired to reduce the speed of the driving shaft 31, the cluster gear 19 will be moved to the position indicated in FIG. 1. This will place the auxiliary gear 21 in meshing engagement with the gear 33. It will be noted that the main cluster gear 20 is still meshing with the pinion 15. This gear ratio will impart a slower revolution to shaft 31 than when the main cluster gear 20 engages both the pinion 15 and the gear 32. In order to effect the previously indicated gear change of the cluster gear 19, pressurized air is introduced into inlet line 25 in order to move the shaft 24 outwardly and away from the cylinder 30. This action will in turn also move the draw bar shaft 28 downwardly as viewed in FIG. 1 and will cause the shaft 28 to slide within the spindle shaft 22 and the cluster gear 19 along the outer diameter of shaft 22. As the key 39 is secured to the shaft 28, the arm portions 42 of key 39 will move in the slots 36 of spindle shaft 22. It will be appreciated that during the rotation of the drive pinion 15 and its consequent rotation of the main gear 20 that both the shafts 22 and 28 will rotate. Shaft 28 will rotate because of the interconnections with the key arm portions 42 secured in the cluster gear 19 and shaft 22 will rotate by contact with the arm portions 42 contacting the adjacent wall portions of the slots 36. The drawbar shaft 28 will both rotate and slide causing a corresponding rotation and shifting of the cluster gear 19. The cluster gear 19 will slide along the outer surface of the shaft 22 but the latter will rotate in unison with the cluster gear 19. The rectilinear movement of the piston rod 24 will cause a corresponding movement of the drawbar 28 by reason of its connection thereto by means of the bearing assembly 27. However, the gear cluster 19 is rotated by the motor 11 by reason of the engagement of the gear 20 with the pinion 15. Such rotation causes a corresponding rotation of the drawbar 28 relative to the piston rod 24 but such rotation is unimpeded because of the coupling of the drawbar 28 to the piston rod 24 through the bearing assembly 27. In order to place the gear cluster 19 back to its original position as shown in FIG. 2 all that is required is that the introduction of pressurized air to cylinder 30 be reversed with pressurized air entering the inlet 26 with an exit into the air line 25.

During the previous reciprocal movement of the shaft 28 through its interconnection with the bearing assembly 27 and to the shaft 24, it will be appreciated that no sliding action will be imparted by the rotation of the draw bar shaft 28 during gear change as the draw bar shaft 28 is free to rotate over the bearings 49. Further, as the shifting air cylinder 30 is interconnected to cluster gear 19 by the coaxial connection of the shafts 24 and 28 through the key 39 and its associated arms 42, no moment forces exist with respect to the shifted cluster gear 19. It will thus be seen that a change of gears in the gear train drive has been effected without the use of shifting fork and sliding gears or the constant mesh gearing using clutch and/or brake shifting with its previously explained consequent disadvantages. This has been effected by a unique coaxial interconnection of a cluster gear with a slidable and rotatable shaft which with the interconnection of key 39 as well as arms 42 and keyways 40 and 54 affords in effect a cross pin type interconnection. This interconnection will provide not only rotation of the drawbar shaft 28 and the gear cluster 19 but also a sliding of the shaft 28 inside the spindle shaft 22 causing a corresponding shifting movement of the gear cluster 19. The advantages of this interconnection is also complemented by the bearing assembly connection 27 with the drawbar shaft 28 and the piston rod 24.

The gear change apparatus has been described in conjunction with a machine tool spindle drive apparatus. Other types of drive mechanisms can advantageously employ the gear change mechanism of this invention where heavy loads are being transmitted and it is desired to operate the transmission at relatively high speeds.

Although an illustrative embodiment of the invention has been described in considerable detail for the purpose of fully disclosing the practical operative structure incorporating the invention, as indicated, the particular apparatus shown and described is intended to be illustrative only and the various novel features of the invention may be incorporated in other structural forms without departing from the spirit and scope of the invention as defined in the subjoined claims.

The principles of this invention having now been fully explained in connection with the foregoing, I hereby claim as my invention:

1. In a transmission connectable to drive a machine tool spindle and to receive power from a power source, and having a gear train including a gear shiftable along a supporting shaft to establish a specified gear ratio for said transmission, a gear shifting mechanism comprising:

a draw bar:
means for supporting said draw bar for rotary and rectilinear movements;
means for applying a shifting force to said draw bar to move said draw bar rectilinearly; and
means for coupling said draw bar to said gear to establish said gear ratio, wherein said coupling means comprises:
a member secured to said draw bar having a pair of arms extending radially outward from the axis of said draw bar in opposing relationship with each other for distributing said shifting force over a face of said gear to retain said gear in balance relative to said supporting shaft as said gear is shifted and;
means for securing each of said arms to the face of said gear so that said arms extend radially outward from the axis of said gear in opposing relationship with each other.

2. The mechanism of claim 1 wherein:
said securing means includes an annular member positioned around said supporting shaft and attached to said gear face so that said arms are trapped between said annular member and said gear face.

3. The mechanism of claim 1 wherein:
said supporting shaft is rotatably supported and extends through a central bore in said gear to support said gear for sliding movement along the periphery of said supporting shaft; and
a central bore is formed in said supporting shaft for receiving said draw bar in coaxial sliding relationship, said supporting shaft being further provided with opposing slots oriented along said supporting shaft in parallel relation with the axis of said bore, said arms extending through said slots for moving said gear and said draw bar rectilinearly in unison relative to said supporting shaft, and for rotating said draw bar in unison with said gear and said shaft.

4. The mechanism of claim 2 wherein:
said gear train includes a plurality of gears mounted on said supporting shaft for rotation, and for rectilinear movement in unison with said draw bar to establish one of a plurality of gear ratios for said transmission.

5. The mechanism of claim 3 wherein:
said means for moving said draw bar rectilinearly comprises an actuator shaft and means for moving said actuator shaft along an axis; and
said draw bar supporting means includes means for supporting said draw bar and said gear for movement along said axis with said actuator shaft, while permitting said draw bar to rotate relative to said actuator shaft.

* * * * *